(12) United States Patent
Pfitzmann et al.

(10) Patent No.: US 7,240,362 B2
(45) Date of Patent: Jul. 3, 2007

(54) PROVIDING IDENTITY-RELATED INFORMATION AND PREVENTING MAN-IN-THE-MIDDLE ATTACKS

(75) Inventors: Birgit M. Pfitzmann, Samstagern (CH); Michael Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 10/638,184

(22) Filed: Aug. 8, 2003

(65) Prior Publication Data
US 2004/0064687 A1  Apr. 1, 2004

(30) Foreign Application Priority Data
Sep. 3, 2002  (EP)  ................................... 02405761

(51) Int. Cl.
*H04L 9/32* (2006.01)
(52) U.S. Cl. ............................... 726/2; 726/3; 713/168
(58) Field of Classification Search ........ 713/168–170, 713/175–176; 726/27–30, 2–3, 8
See application file for complete search history.

(56) References Cited

U.S. PATENT DOCUMENTS 6,035,402 A * 3/2000 Vaeth et al. ................... 726/2
6,085,322 A * 7/2000 Romney et al. ............. 713/176
6,145,079 A * 11/2000 Mitty et al. ................. 713/170

* cited by examiner

*Primary Examiner*—Hosuk Song
(74) *Attorney, Agent, or Firm*—Scully, Scott, Murphy & Presser, P.; Lisa M. Yamonaco

(57) ABSTRACT

This invention provides identity-related information about a client application to an honest requesting entity, ensuring identity of client applications and preventing man-in-the-middle attacks. An example method comprises transferring identity-related information hosted on an identity provider about a client application to an honest requesting entity by: the client application receiving from a particular entity a request to forward an inner request comprising an identifier of the honest requesting entity to an identity provider selected by the client application; the client application forwards the inner request to the identity provider holding the identity-related information; the client application receives from the identity provider a response envelope instructing the client application to forward an inner response comprising the identity-related information requested in the inner request and the identifier; the client application derives an address of the honest requesting entity having the identifier; and the client application forwards the inner response to the derived address.

16 Claims, 5 Drawing Sheets

PROVIDING IDENTITY-RELATED INFORMATION AND PREVENTING MAN-IN-THE-MIDDLE ATTACKS

FIELD OF INVENTION

The present invention is directed to a providing identity-related information about a client application to an honest requesting entity, thereby ensuring the true identity of the client application and preventing man-in-the-middle attacks. Moreover, the invention is related to a method for transferring identity-related information hosted on an identity provider about a client application to an honest requesting entity.

BACKGROUND OF THE INVENTION

Identity management in its widest sense means management of all the personal information about a person, including at least all the person's digital relations. Over the next decade, identity management systems in this wide sense are likely to evolve. Short-term, identity management is typically said for web single sign-on with the transfer of a small amount of data about a person.

Single sign-on enables a person or user to log in to different organizations or services, while remembering only one password, and thus authenticating only once, without allowing all the organizations to impersonate the person towards each other as simply as using the same password directly with all organizations would. Furthermore, single sign-on protocols allow client applications to identify themselves to other applications with whom they had not a priori exchanged any common data, such as keys. Usually, a user chooses the same username and password with all the organizations or services, which is problematic. Each service can impersonate the user towards the others. This may be acceptable for services of one enterprise, but even there one would prefer better modularization. And clearly it is not acceptable for a user's overall web experience. Services that need initial identification of the user, with respect to a preexisting identity, would still all need to perform this identification. An object of a real single sign-on protocols is therefore to solve these problems.

Single sign-on is widely seen as a necessary infrastructure to make electronic business on the Internet easier and to allow widespread use of the emerging Web Services. It may also evolve into more general identity management, e.g., for exchanging additional information about a person once the identity has been established.

Known single sign-on solutions include, for example,

Microsoft Corporation's Passport system (URL: http://www.passport.com), the OASIS (Organization for the Advancement of Structured Information Standards) standardization of the Security Assertion Markup Language (SAML) (URL: http://www.oasis-open.org/committees/security/docs), and the Liberty Alliance Project's recent specification (URL: http://www.projectliberty.org). An aspect in the Liberty specifications is that detailed protocols are provided not only for browsers as client applications, but also more efficient protocols for other, more powerful client applications. Older related schemes in this setting are classical three-party authentication protocols.

None of the known products and proposals fulfills all the following requirements, which seem to be relevant for non-browser client applications in an Internet-based scenario:

Req 1: Security against a man-in-the-middle attack, i.e., not even a rogue service provider should be able to impersonate a correct client application to another service provider.

Req. 2: No need for cryptography in the client application beyond secure channels, such as Secure Socket Layer (SSL) or its successor Transport Layer Security (TLS), used through their normal interfaces.

Req. 3: Better efficiency than by implementing a protocol that was designed for a browser client.

Classical three-party authentication protocols like Kerberos, Needham-Schroeder all start with a key-exchange or key-confirmation protocol and then require the client application to use this key for encryption and authentication. In other words, a third party that can identify the client application by some a-priori exchanged information, such as a password, secret key, or confirmed public key, typically generates a new secret key for communication between the client application and its partner entity, which herein is called "requesting entity", and transfers this secret key securely to both these entities. There is a great variety of protocols for carrying out this secure transfer of the secret key. Another variant is that the third party only gives an online confirmation (certificate) of a public key of the client application. However, after each of these protocols, the client application has to use the new or confirmed key in the communication. This conflicts with the second requirement (Req. 2), which says that the client application need only use a secure-channel protocol through its normal interface, without any cryptography of its own.

One could also, in contrast to the third requirement (Req. 3), implement any protocol intended for browser clients on non-browser clients. However, this is unnatural and inefficient for other client applications such as Web Services: On the one hand, they would need detailed functionality of browsers only for this purpose, e.g., redirection and understanding cache control. On the other hand, browser protocols have certain limitations which are no longer necessary with a normal client application. For instance, a redirect can only be made to an a-priori known party. Hence, if the requesting entity initially does not know which third party holds information about a certain browser user, it first needs steps to find that out, and then the redirect can start. In contrast, a normal client application can be programmed to understand a request of the form "please forward this question to the third party holding your identity-related information". This saves two steps and thus an Internet round-trip. Furthermore, a browser can at most carry information, such as a request for identity-related information or the returned identity-related information, unchanged from one party to the other (using a redirect), but not make any verifications on this information itself.

The combination of the second and third requirements (Req. 2 and 3) was so far only addressed by the Liberty Alliance Project (URL: http://www.projectliberty.org), more precisely in its "Liberty Bindings and Profiles Specification", Version 1.0, 11, Jul. 2002, Section 3.2.5, "Liberty-Enabled Client and Proxy Profile". However, this protocol does not fulfill the first requirement (Req. 1), security against man-in-the-middle attack: A rogue service provider (e.g., the owner of a web shop) to whom the client application is currently identifying can impersonate this client application to another service provider (e.g., the client's bank, or a company that has a supply-chain relation with the client's employer) and thus harm the user, or harm the other service provider by doing mischief with the user's privileges. The problem is that the rogue service provider can, in its request for identity information, combine the name of the other service provider with its own (the rogue service provider's) address. Then it gets a "ticket" suitable for identifying to the other service provider sent to its own address, and can subsequently use it. From the above it follows that there is still a need in the art for an improved single sign-on or authentication system for arbitrary client applications using existing secure channels and preventing man-in-the-middle attacks.

SUMMARY OF THE INVENTION

Thus, the present invention provides methods, apparatus and systems for ensuring authenticity in a class of authentication protocols where a client or client application, that is controlled by a user, wants to authenticate to a second party, hereafter referred to as honest requesting entity, under a name pre-established with a third party, hereafter referred to as identity provider. More generally, the client application may want to transfer arbitrary identity-related information.

A first aspect of the present invention in such a setting is to prevent man-in-the-middle attacks, where a rogue or dishonest requesting entity, also called adversary, uses the information obtained about the client to impersonate this client towards another, honest requesting entity, thus abusing privileges of the client. The scheme prevents such man-in-the-middle attacks. An example is a method for providing identity-related information about a client application to an honest requesting entity, thereby ensuring the true identity of the client application. The method comprising: a request initiation step wherein the client application receives from a particular requesting entity, which may be the honest requesting entity or a dishonest requesting entity, a request envelope instructing the client application to forward an inner request comprising an identifier of the honest requesting entity to an identity provider to be selected by the client application; a request forwarding step wherein the client application forwards the inner request to the identity provider holding the identity-related information; a response initiation step wherein the client application receives from the identity provider a response envelope instructing the client application to forward an inner response comprising the identity-related information requested in the inner request and the identifier; an authentication step wherein the client application derives an address of the honest requesting entity having the identifier; and a response forwarding step wherein the client application forwards the inner response to the derived address.

In accordance with a second aspect of the present invention, there is presented an example of a method for transferring identity-related information hosted on an identity provider about a client application to an honest requesting entity. The method comprising receiving in a request forwarding step from the client application an inner request, wherein prior to the request forwarding step a request initiation step is performed in which the client application receives from a particular requesting entity, which may be a honest requesting entity or a dishonest requesting entity, a request envelope instructing the client application to forward the inner request comprising an identifier of the honest requesting entity to the identity provider; and transmitting to the client application in a response initiation step a response envelope instructing the client application to forward an inner response comprising the identity-related information requested in the inner request and the identifier, such that the client application in an authentication step is able to derive an address of the honest requesting entity having the iden-tifier, and in a response forwarding step is able to forward the inner response to the derived address.

In accordance with a third aspect of the present invention, there is presented an example of a system for providing identity-related information about a client application to an honest requesting entity, thereby ensuring the true identity of the client application. The system comprising: an identity provider providing the identity-related information; the client application being connectable to the identity provider; and an honest requesting entity or a dishonest requesting entity from which the client application receives a request envelope instructing the client application to forward an inner request comprising an identifier of the honest requesting entity to the identity provider, wherein the client application is adapted to receive from the identity provider a response envelope instructing the client application to forward an inner response comprising the identity-related information requested in the inner request and the identifier, to derive an address of the honest requesting entity having the identifier, and to forward the inner response to the derived address.

DESCRIPTION OF THE DRAWINGS

These and other aspects, features, and advantages of the present invention will become apparent upon further consideration of the following detailed description of the invention when read in conjunction with the drawing figures, in which.

Figure 1:
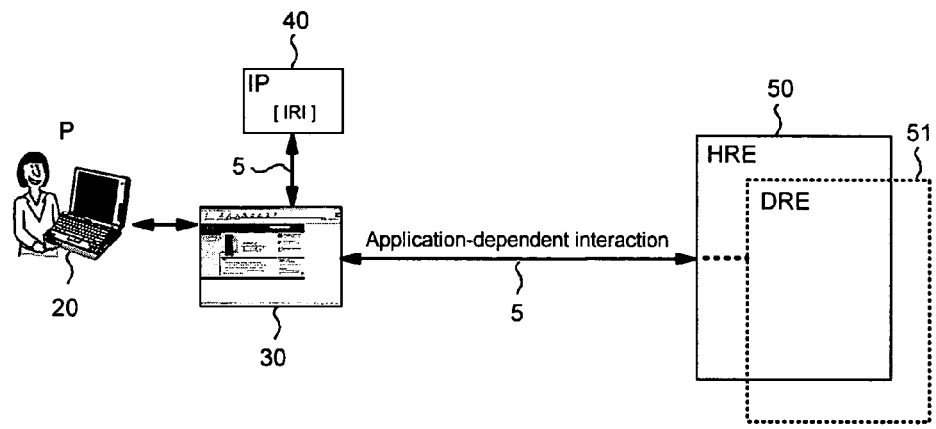
FIG. 1 shows an illustration of a system according to the present invention.

The drawings are provided for illustrative purpose only and do not necessarily represent practical examples of the present invention to scale.

GLOSSARY

The following are informal definitions to aid in the understanding of the description.

User or Person: An entity whose identity is managed. If the person acts it becomes the user. Typically the person or user is an individual, but at least small businesses will often interact with other businesses just like individuals, e.g., in travel booking and information gathering.

Requesting entity: An entity, e.g. an organization represented by a server, who wants to know a name or attributes of a person. Initial organizations will mainly be Internet shops because of the low assurance of any easily deployable registration system. In the long run, organizations include all a person's communication partners such as banks, doctors, colleagues, and family. Colleagues and family as "organizations" are particularly relevant if one wants to include contact or location information in identity management, e.g., instant messaging and calendering.

Identity Provider: An entity that stores identity-related information for a person. The identity provider is also referred to as wallet. By identity provider or wallet is meant a component, typically software, that stores and handles personal information for the person or, in the case that the client application acts independently, for the client application.

The term computer includes devices like PCs but also digital assistants and mobile phones with facilities to interact via the Internet or another network with a requesting entity.

DESCRIPTION OF THE INVENTION

The present invention provides methods, apparatus and systems for ensuring authenticity in a class of authentication protocols where a client or client application, that is controlled by a user, wants to authenticate to a second party, hereafter referred to as honest requesting entity, under a name pre-established with a third party, hereafter referred to as identity provider. More generally, the client application may want to transfer arbitrary identity-related information. The client application is not intended to be only a browser, but running a normal program. An important aspect in such a setting is to prevent man-in-the-middle attacks, where a rogue or dishonest requesting entity, also called adversary, uses the information obtained about the client to impersonate this client towards another, honest requesting entity, thus abusing privileges of the client. The scheme prevents such man-in-the-middle attacks.

In accordance with the present invention, there is presented a method for providing identity-related information about a client application to an honest requesting entity, thereby ensuring the true identity of the client application, the method comprising: a request initiation step wherein the client application receives from a particular requesting entity, which may be the honest requesting entity or a dishonest requesting entity, a request envelope instructing the client application to forward an inner request comprising an identifier of the honest requesting entity to an identity provider to be selected by the client application; a request forwarding step wherein the client application forwards the inner request to the identity provider holding the identity-related information; a response initiation step wherein the client application receives from the identity provider a response envelope instructing the client application to forward an inner response comprising the identity-related information requested in the inner request and the identifier; an authentication step wherein the client application derives an address of the honest requesting entity having the identifier; and a response forwarding step wherein the client application forwards the inner response to the derived address.

In general, the client application, or its user, can be authenticated in accordance with the above method to the honest requesting entity, while the same method cannot be misused by a dishonest requesting entity, to whom the client application might also be authenticating at a certain time, to abuse the information obtained through this method to impersonate the client application towards the honest requesting entity. For instance, the client application may be a web service client acting for a certain user in purchasing and banking, the honest requesting entity may be a bank, and the dishonest requesting entity may be a web shop where the user is buying something, so that the client application provides the user's name and address as identity-related information to the web shop. The method makes sure that in this example, the web shop cannot impersonate the user to the bank and thus, e.g., not transfer money in the user's name, or use the contact to the bank as a start for identity theft.

When the client application is not only a browser, the client application's processing abilities can be used to let it select the appropriate identity provider prior to the request forwarding step. This may be the user's only identity provider, or the client application may even study the inner request to find an appropriate identity provider among several that hold different types of identity-related information about the user, such as financial versus work-related. It is also conceivable that the client application acts for several users and now chooses the appropriate identity provider for its current user.

The authentication step supports the overall benefit by ensuring that the inner response, if it comprises the identifier of the honest requesting entity and is thus acceptable to the honest requesting entity, will not be sent to any other entity, in particular not to the dishonest requesting entity that may have initiated the protocol. In contrast to known protocols, where the client application is only a browser, the client application's processing abilities may be used in an embodiment to guarantee that the client application derives the correct address in the authentication step.

The request forwarding step and the response initiation step can be performed through at least one secure channel, thereby the identity provider ensures the connection to the client application where the identity-related information is sent. By doing so the adversary or dishonest requesting entity who controls part of the network, be it via sniffing, spoofing, or address manipulations, cannot impersonate the client application towards the identity provider. In particular, the dishonest requesting entity cannot directly contact the identity provider with the request forwarding step in order to obtain the response envelope which would enable it to then impersonate the client application towards the honest requesting entity, nor can it sniff out the response envelope in the response initiation step. The at least one secure channel can be provided by one of a secure sockets layer (SSL), and transport layer security (TLS) together with any known technique for authenticating the client application. Secure sockets layer and transport layer security are widely implemented standards for secure channels, in particular in the HTTPS protocol, and can be expected to be already implemented on almost all systems, thus significantly reducing the development and deployment cost of using the presented method.

The response forwarding step can be performed via a further secure channel, thereby the client application ensures the connection to the address resulting from the authentication step. By doing so the adversary or dishonest requesting entity who controls part of the network cannot obtain the inner response in the response forwarding step while it is being addressed to the address, and thus cannot use the inner response to impersonate the client application towards the honest requesting entity. The further secure channel can be provided by a secure sockets layer (SSL) or a transport layer security (TLS). The address can be a uniform resource identifier (URI). Such uniform resource identifiers (URI) are widely implemented standards for addressing entities on the Internet, so that no new name translations are needed for this method.

Further embodiments of the authentication step wherein the client application derives the address of the honest requesting entity having the identifier can be performed as follows.

The address can be derived from the identifier provided within the inner request by using local or directory information. Through the given appropriate infrastructure, the client application can thus simply derive the correct address without help by other protocol participants.

The address can be obtained from the response envelope. By doing so the client application can make use of the typically better infrastructure and processing power at the identity provider, and simply obtain and use a correct address that the identity provider has derived and inserted into the response envelope. By obtaining the address from the response envelope it is also understood the case where the response envelope only comprises a confirmation element by which the identity provider confirms to have verified the address provided within the inner request, and the client application then takes the verified address from the inner request.

The address provided in the request envelope can be verified with respect to the identifier provided within the inner request by using local or directory information. The honest requesting entity may have several addresses, and by inserting the appropriate address for the current protocol into the request envelope, the honest requesting entity can ensure that the client application knows which of the several possible addresses to use. Nevertheless, the client application still verifies the received address to make sure that it is one of the honest requesting entity as identified by the identifier and not, e.g., of the dishonest requesting entity.

Furthermore, an envelope authentication element provided with the request envelope can be verified with respect to the identifier and in the event of the validity of the envelope authentication element the address provided in the request envelope can be used. The envelope authentication element can be based on an extensible markup language (XML) signature. The envelope authentication element, in the event of validity, ensures that the request envelope was constructed by the honest requesting entity, because that is the entity who has the identifier. Thus the client application can believe the address provided in the request envelope without taking any further actions. A specific benefit of verifying an authentication element instead of deriving or verifying an address is that an infrastructure for verification keys may be available (e.g., the authentication element may comprises a certificate, or a public-key directory may be available), while no equally trustworthy infrastructure for identifier-to-address mappings may be available. An authenticity verification usually uses cryptography, while an address derivation may not.

In accordance with a second aspect of the present invention, there is presented a method for transferring identity-related information hosted on an identity provider about a client application to an honest requesting entity, the method comprising receiving in a request forwarding step from the client application an inner request, wherein prior to the request forwarding step a request initiation step is performed in which the client application receives from a particular requesting entity, which may be a honest requesting entity or a dishonest requesting entity, a request envelope instructing the client application to forward the inner request comprising an identifier of the honest requesting entity to the identity provider; and transmitting to the client application in a response initiation step a response envelope instructing the client application to forward an inner response comprising the identity-related information requested in the inner request and the identifier, such that the client application in an authentication step is able to derive an address of the honest requesting entity having the identifier, and in a response forwarding step is able to forward the inner response to the derived address.

The inner response can further comprise a response authentication element for protection. This is advantageous in that the requesting entity, when it obtains this response, can make sure that the inner response is unmodified and was generated by one identity provider that it trusts for this identity-related information. The response authentication element can be based on an extensible markup language (XML) signature. The benefit of this is that XML signatures are a widely accepted standard by the W3C, the World Wide Web Consortium. Thus it should help to achieve inter operability between different identity providers and requesting entities without additional implementation cost.

In further embodiments the identity provider can, prior to the response initiation step, derive the address from the identifier and insert the derived address in the response envelope. The identity provider can thus offer its typically better infrastructure and processing power to the client application, which can then simply use the address that the identity provider has inserted into the response envelope. By inserting the address in the response envelope it is also understood the case where the identity provider only inserts a confirmation element in the response envelope thus confirming to have verified the address which is provided within the inner request.

The derivation can be performed as follows. The address can be derived from the identifier provided within the inner request by using local or directory information. By using the given appropriate infrastructure, the identity provider can simply derive the correct address without help by the requesting entity.

The address provided in the inner request can be verified with respect to the identifier provided within the inner request by using local or directory information. The honest requesting entity may have several addresses, and by inserting the appropriate address for the current protocol in the inner request, the honest requesting entity can ensure that the identity provider knows which of the several possible addresses to tell the client application. Nevertheless, the identity provider still verifies the received address to make sure that it is one of the honest requesting entity as identified by the identifier and not, e.g., of the dishonest requesting entity.

An inner authentication element provided with the inner request can be verified with respect to the identifier and in the event of the validity of the inner authentication element the address provided in the inner request can be used. The inner authentication element, in the event of validity, ensures that the address proposal is made by the honest requesting entity, because that is the entity who has the identifier. Thus the identity provider can believe the address provided in the inner request without taking any further actions. The inner authentication element can be based on an extensible markup language (XML) signature.

In accordance with a third aspect of the present invention, there is presented a system for providing identity-related information about a client application to an honest requesting entity, thereby ensuring the true identity of the client application. The system comprising: an identity provider providing the identity-related information; the client application being connectable to the identity provider; and an honest requesting entity or a dishonest requesting entity from which the client application receives a request envelope instructing the client application to forward an inner request comprising an identifier of the honest requesting entity to the identity provider, wherein the client application is adapted to receive from the identity provider a response envelope instructing the client application to forward an inner response comprising the identity-related information requested in the inner request and the identifier, to derive an address of the honest requesting entity having the identifier, and to forward the inner response to the derived address.

The honest requesting entity receiving the inner response can verify a response authentication element provided by the identity provider and the validity of the identifier of the honest requesting entity. The advantage of the verification of the response authentication element is that the honest requesting entity thus ensures that the inner response comes unmodified from the identity provider, and the honest requesting entity can decide whether it trusts this identity provider for the identity-related information provided in the inner response. The additional verification that its own (the honest requesting entity's) identifier ID is contained in the inner response ensures that the honest requesting entity accepts no inner response that was intended for the dishonest requesting entity. This prevents such a dishonest requesting entity from impersonating the client application.

The honest requesting entity, when preparing the request envelope, can perform one of the following steps.

The honest requesting entity can insert the address of the honest requesting entity in the request envelope. As the honest requesting entity may have several addresses, and by inserting the appropriate address for the current protocol in the request envelope, the honest requesting entity can ensure that the client application knows which of the several possible addresses to use.

The honest requesting entity can insert the address of the honest requesting entity and an envelope authentication element in the request envelope. The envelope authentication element enables the client application to verify that the request envelope has been constructed by the honest requesting entity, so that the client application can use the address provided in the request envelope without taking any further actions.

The honest requesting entity can insert the address of the honest requesting entity in the inner request. By inserting the address into the inner request instead of the request envelope as above, the identity provider will receive the address and can thus offer its typically better infrastructure and processing power to assist the client application in validating the correctness of the address.

The honest requesting entity can insert the address of the honest requesting entity and an inner authentication element in the inner request. The inner authentication element enables the identity provider to verify that the inner request has been constructed by the honest requesting entity, so that identity provider can forward the address provided in the inner request to the client application without taking any further actions.

When reference to FIG. 1, the general layout of a communication environment is described in which the invention can be used. In the figures, same reference signs are used to denote the same or like parts. FIG. 1 shows a person P, who acts as a user 20. The user 20 executes a client application 30, e.g. a web services client, an extended web browser, a shopping agent, a financial-services tool, or any other application that represents the user 20. A client application 30 is typically executed on the user 20's computer, but may also be executed on another computer as long as one can assume that it acts faithfully for its user. In some cases, the client application 30 may even act as an independent entity with an identity of its own and without the user 20. The client application 30 is connected for application-dependent interactions to an honest requesting entity 50, e.g. a server of a company or bank which provides services. The client application 30 and the requesting entity 50 are connected via communication lines 5 as they are known in the art. The communication lines 5 are usually provided through a network, e.g. the Internet. However, as indicated in the figure by a dotted line, the client application 30 can also be connected to a dishonest requesting entity 51, which is not intended. The client application 30 is further connected to an identity provider 40, also referred to as wallet, whereby the identity provider 40 can be local, i.e. at the computer of the user 20, or remote, i.e. on an external server or the like. The identity provider 40 holds identity-related information IRI of the user 20 or the client application 30. Under the term identity-related information IRI is understood any information related to a person or user. Identity-related information IRI comprises names, addresses, group memberships, authorization credentials, demographic data, personal preferences, calendar entries, medical and financial information, and everything else that may be stored digitally about a person or under a user name. The requesting entity 50 may desire it for access control, authorization, personalization, authentication, login, commercial, medical, or governmental issues, or any other application operating on identity-related information IRI. The scenario in FIG. 1 is shown to facilitate the description of the following flows for providing the identity-related information IRI to the honest requesting entity 50, thereby avoiding man-in-the-middle attacks. The particular identity-related information IRI provided in one such flow, also called protocol execution, is typically only a part of the overall identity-related information about the user 20 or client application 30 that the identity provider 40 holds.

Figure 2:
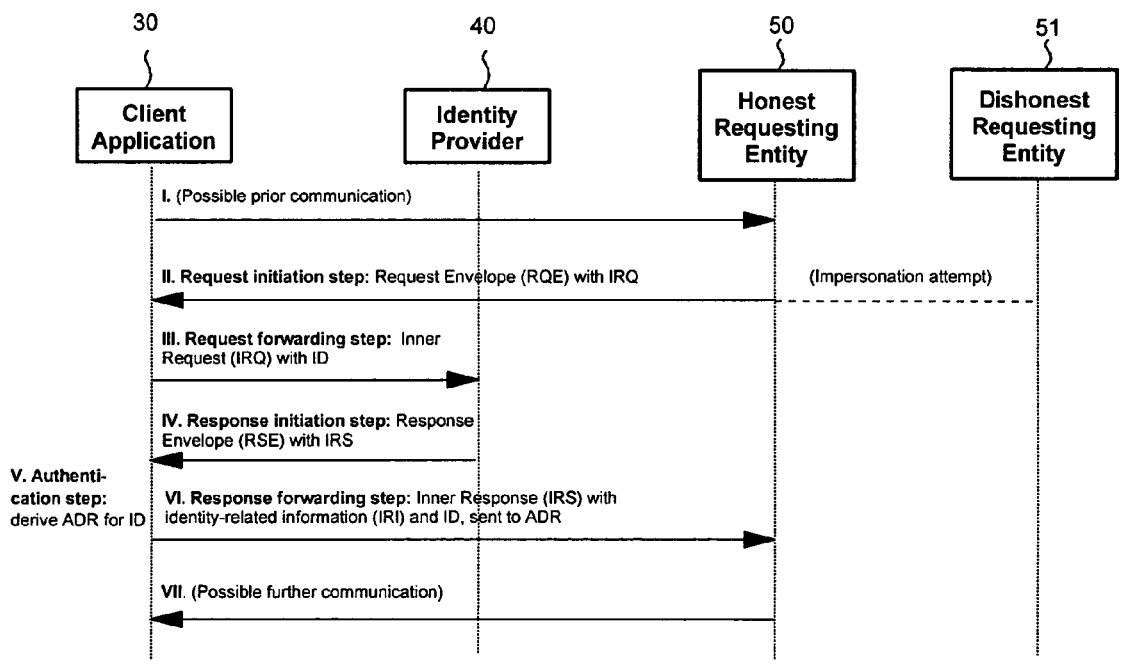
FIG. 2 shows an illustration of the message flow of a first embodiment according to the present invention.

FIG. 2 shows an illustration of a message flow for providing identity-related information IRI about the client application 30 to the honest requesting entity 50. Therein, the flow between the client application 30, the identity provider 40 holding the identity-related information IRI, the honest requesting entity 50, and the dishonest requesting entity 51 is depicted with labeled arrows or steps to which respective Roman numbers are assigned. The flow is understood as being performed sequentially from top to bottom as indicated by the increasing Roman numbers. In step I a possible prior application is indicated, performed between the client application 30 and the honest requesting entity 50. In a request initiation step II, the client application 30 receives from the honest requesting entity 50 or the dishonest requesting entity 51 a request envelope RQE. The broken line here indicates an impersonation attempt by the dishonest requesting entity 51. The request envelope RQE instructs the client application 30 to forward an inner request IRQ comprising an identifier ID of the honest requesting entity 50 to the identity provider 40. The request envelope RQE can comprise additional information besides this instruction. Thereby, the identity provider can be chosen by the client application with or without limitations or proposals given in the request envelope RQE. In a request forwarding step III the client application 30 forwards the inner request IRQ to the identity provider 40 holding the identity-related information IRI. The client application 30 usually has a pre-established relationship with the identity provider 40. The identity provider 40 may now take arbitrary actions to derive the identity-related information IRI that it will send in response to the inner request IRQ, such as verifying the identity of the client application 30 or the person 20, consulting privacy policies and other policies, obtaining the identity-related information IRI from other entities where it is actually stored, or asking the client application 30 for the user's consent. The resulting identity-related information IRI may not be exactly what was requested in the inner request IRQ. Further, the client application 30 receives from the identity provider 40 in a response initiation step IV a response envelope RSE instructing the client application 30 to forward an inner response IRS comprising the identity-related information IRI requested in the inner request IRQ and the identifier ID. In an authentication step V the client application 30 derives an address ADR of the honest requesting entity 50 having the identifier ID, to which address ADR the client application 30 sends in a following step the inner response IRS. This assures that the address ADR belongs to the honest requesting entity 50 for whom the identity provider 40 has issued its inner response IRS, so that it is impossible for the dishonest requesting entity 51 to later impersonate the client application 30 to the honest requesting entity 51. In a response forwarding step VI the client application 30 forwards then the inner response IRS to the derived address ADR, that is here the address of the honest requesting entity 50. Moreover, a possible further communication between the honest requesting entity 50 and the client application 30 is indicated with step VII.

Figure 3:
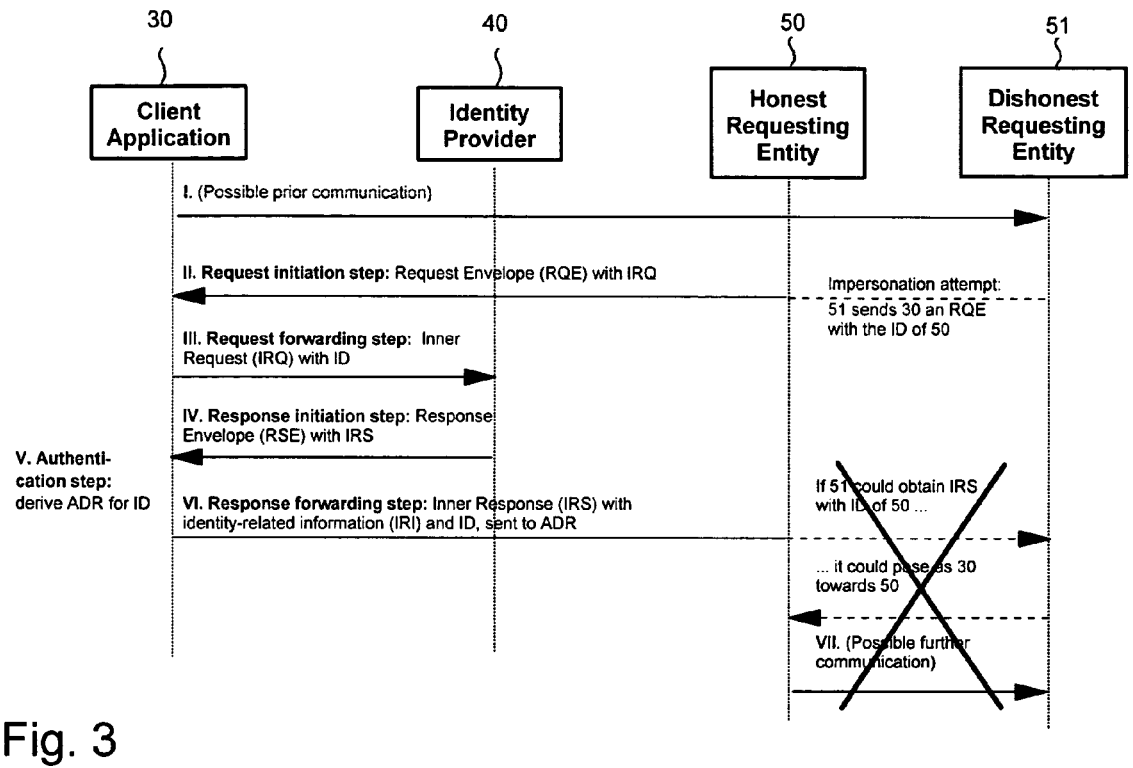
FIG. 3 shows an illustration of the message flow of a second embodiment with an impersonation attempt.

FIG. 3 shows an illustration of a second embodiment with an impersonation attempt that is prevented. The message flow is similar compared to the first embodiment with the difference that in step I the possible prior communication is performed between the client application 30 and the dishonest requesting party 51. In step II the dishonest requesting party 51 tries here an impersonation attempt and sends to the client application 30 the request envelope RQE wherein the inner request IRQ comprises the identifier ID of the honest requesting party 50. When the dishonest requesting party 51 could obtain in the response forwarding step VI the inner response IRS with the identifier ID of the honest requesting party 50, then the dishonest requesting party 51 could pose as the client application 30 towards the honest requesting party 50. However, the protocol prevents the latter, as indicated by the bold cross above the indicated communication between the dishonest requesting party 51 and the honest requesting party 50.

Figure 4:
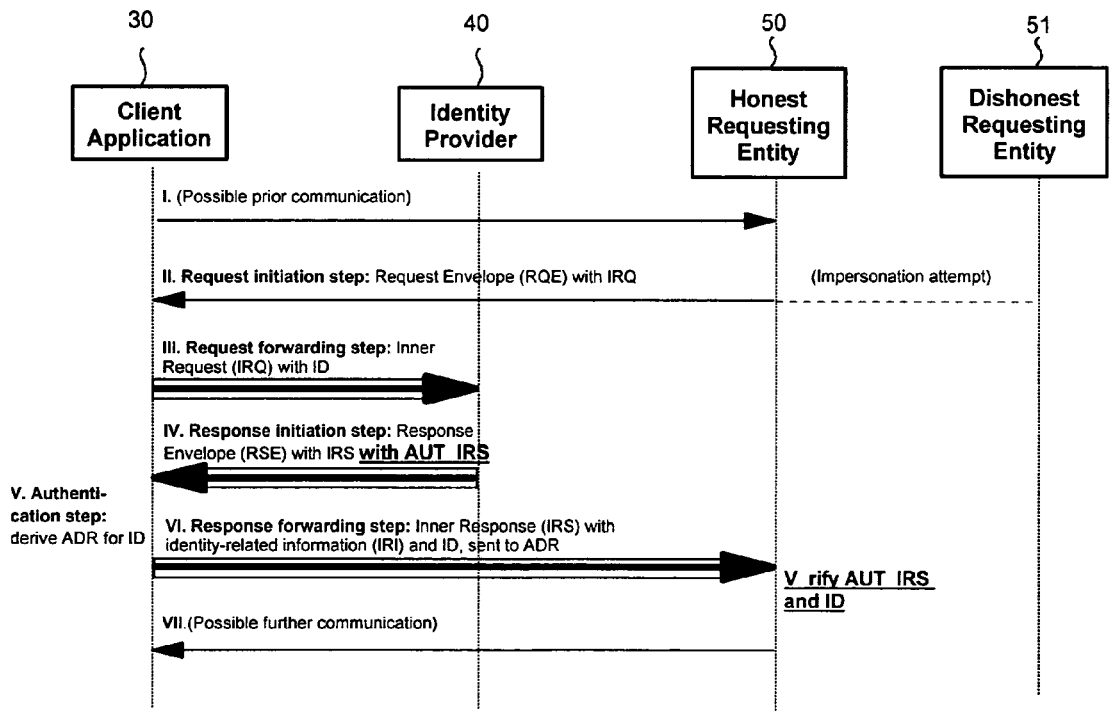
FIG. 4 shows an illustration of the message flow of a third embodiment.

FIG. 4 shows an illustration of the message flow of a third embodiment in which at least one secure channel is used, as it can be provided by a secure sockets layer (SSL) or transport layer security (TLS) or any other secure-channel technique as they are known in the art. The secure channel is indicated with bold arrow lines between the client application 30 and the identity provider 40 in the request forwarding step III and the response initiation step IV. By this secure channel, together with a method to authenticate the client application 30 or its user 20 as they are known in the art the identity provider 40 ensures the connection to the client application 30 where the identity-related information IRI is sent. The identity provider 40 sends in the response initiation step IV the response envelope RSE with the inner response IRS and a response authentication element AUT_IRS. The response authentication element AUT_IRS can be based on an extensible markup language (XML) signature, or on any other authentication technique as they are known in the art. The response forwarding step VI is here performed via a further secure channel. Thereby the client application 30 ensures the connection to the address ADR resulting from the authentication step V. The honest requesting party 50 can then use the response authentication element AUT_IRS and the identifier ID for verification.

Figure 5:
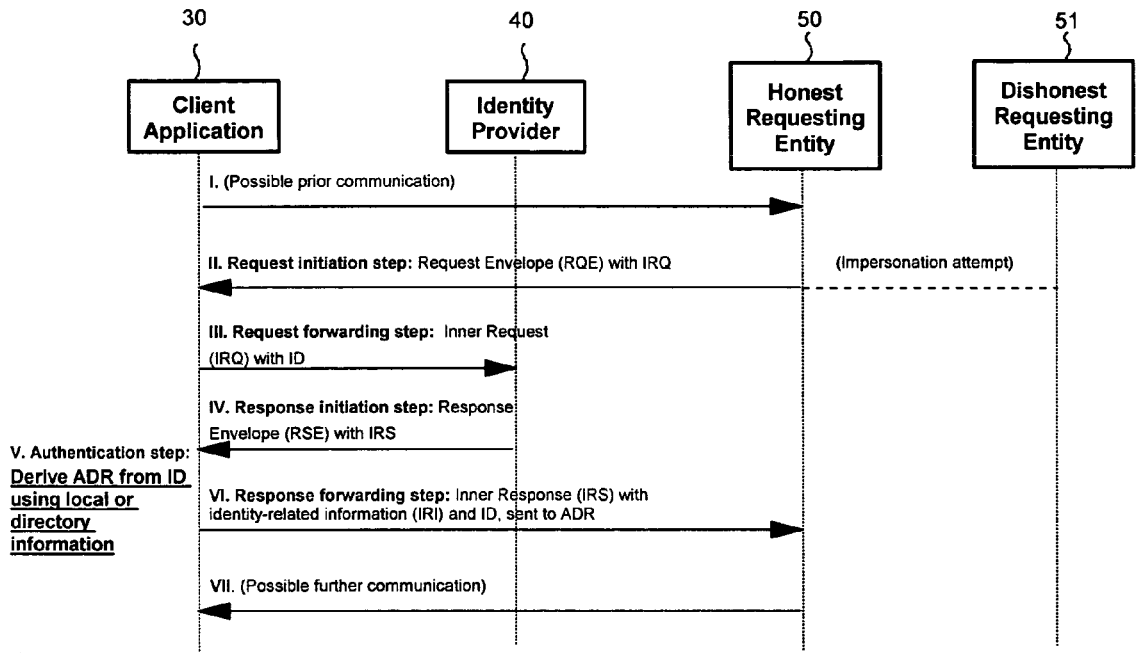
FIG. 5 shows an illustration of the message flow of a fourth embodiment.

FIG. 5 shows an illustration of the message flow of a fourth embodiment. This embodiment differs from the first embodiment in that in the authentication step V the address ADR is derived from the identifier ID provided within the inner request IRQ by using local or directory information. The local information can be stored in a database or table on the local machine. The directory information can provided through the Internet by a directory service.

Figure 6:
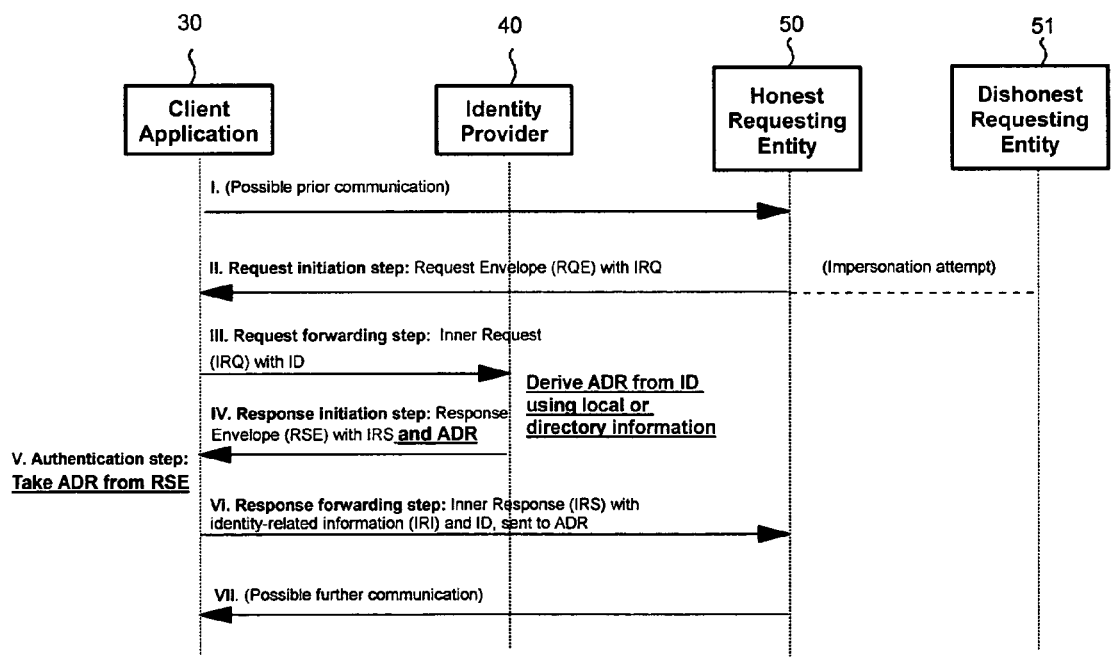
FIG. 6 shows an illustration of the message flow of a fifth embodiment.

FIG. 6 shows an illustration of the message flow of a fifth embodiment. This embodiment differs from the first embodiment in that the identity provider 40 derives the address ADR from the identifier ID provided within the inner request IRQ by using local or directory information. The identity provider 40 sends then in the response initiation step IV the response envelope RSE with the inner response IRS and the derived address ADR. Then, the client application 30 can easily obtain in the authentication step V the address ADR from the response envelope RSE.

Figure 7:
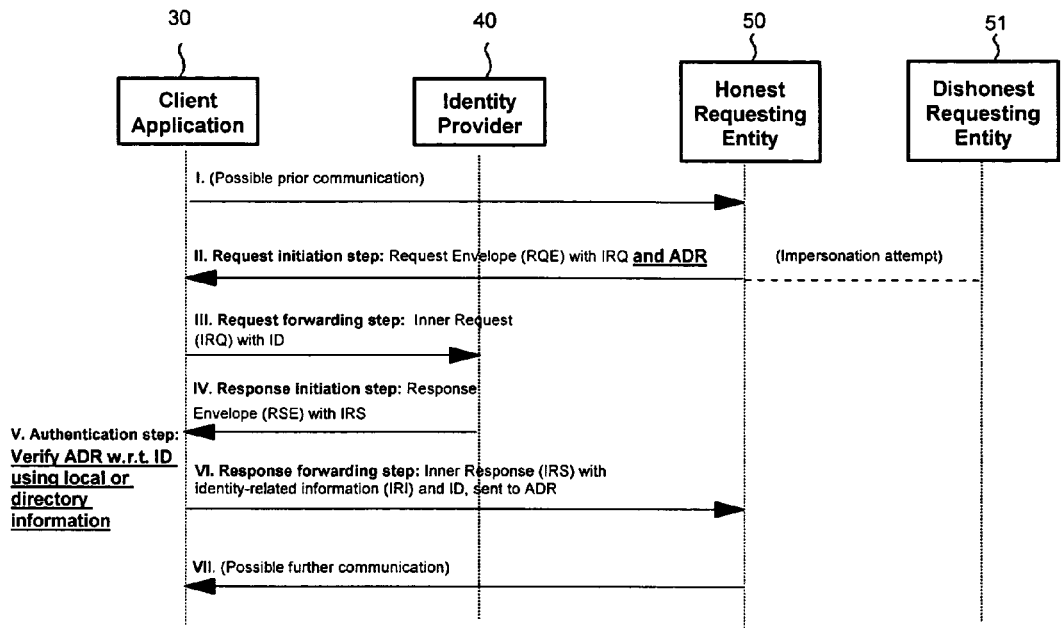
FIG. 7 shows an illustration of the message flow of a sixth embodiment.

FIG. 7 shows an illustration of the message flow of a sixth embodiment. This embodiment differs from the first embodiment in that the honest requesting entity 50, when preparing the request envelope RQE, inserts the address ADR of the honest requesting entity 50 in the request envelope RQE and sends in the request initiation step II the request envelope RQE with the inner request IRQ and the address ADR. Later on the client application 30 can verify in the authentication step V the address ADR provided in the request envelope RQE with respect to the identifier ID provided within the inner request IRQ by using local or directory information.

Figure 8:
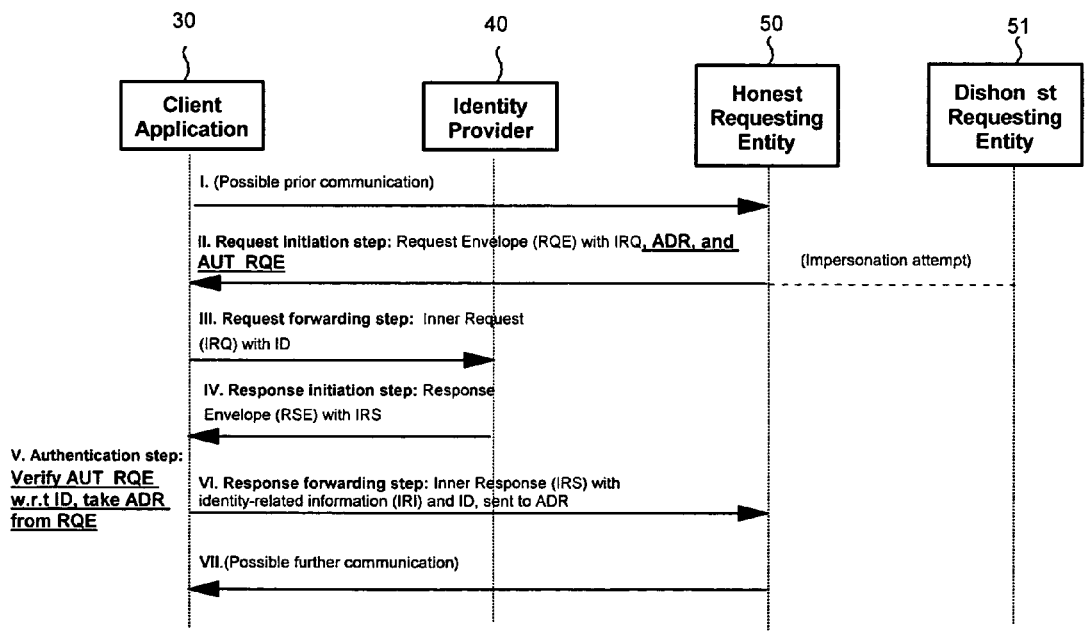
FIG. 8 shows an illustration of the message flow of a seventh embodiment.

FIG. 8 shows an illustration of the message flow of a seventh embodiment. This embodiment differs from the sixth embodiment in that the honest requesting entity 50, when preparing the request envelope RQE, additionally inserts an envelope authentication element AUT_RQE in the request envelope RQE and sends in the request initiation step II the request envelope RQE with the inner request IRQ, the address ADR, and the envelope authentication element AUT_RQE. Then the client application 30 can verify in the authentication step V the envelope authentication element AUT_RQE provided with the request envelope RQE with respect to the identifier ID. In the event of the validity of the envelope authentication element AUT_RQE the address ADR provided in the request envelope (RQE) is used.

Figure 9:
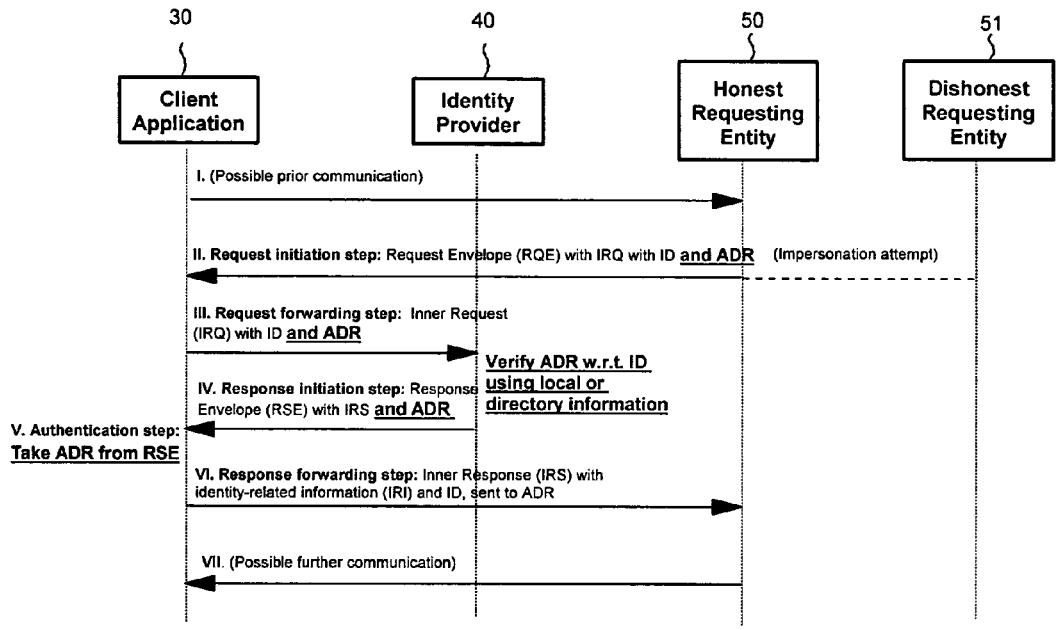
FIG. 9 shows an illustration of the message flow of an eighth embodiment.

FIG. 9 shows an illustration of the message flow of a eighth embodiment. This embodiment differs from the first embodiment in that the honest requesting entity 50 inserts its address ADR in the inner request IRQ within the request envelope RQE and sends it within the request initiation step II. The identity provider 40 can then verify the address ADR provided in the inner request IRQ with respect to the identifier ID provided within the inner request IRQ by using local or directory information, and insert the address ADR or a confirmation element into the response envelope RSE. Later on in the authentication step V the client application 30 obtains the address ADR from the response envelope RSE, or in the event of finding the confirmation element obtains the address ADR from the inner request IRQ.

Figure 10:
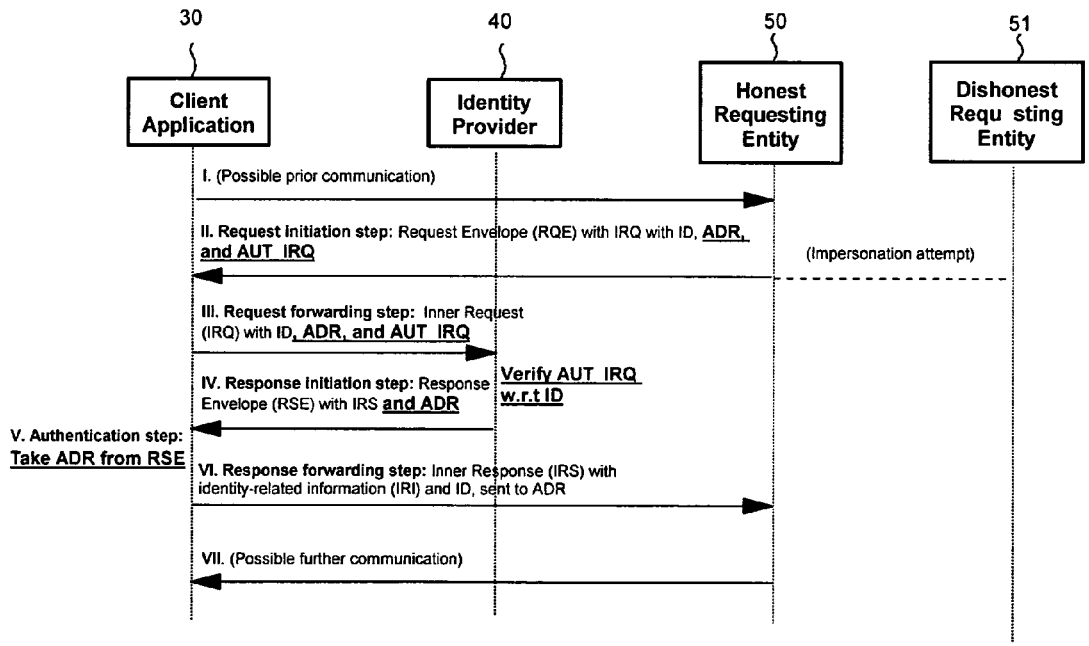
FIG. 10 shows an illustration of the message flow of a ninth embodiment.

FIG. 10 shows an illustration of the message flow of a ninth embodiment. This embodiment differs from the eighth embodiment in that the honest requesting entity 50 additionally inserts an inner authentication element AUT_IRQ in the inner request IRQ within the request envelope RQE. The identity provider 40 can then verify the inner authentication element AUT_IRQ provided with the inner request IRQ with respect to the identifier ID. In the event of the validity of the inner authentication element AUT_IRQ the address ADR provided in the inner request IRQ is used and sent in or confirmed in the response initiation step IV. Later on in the authentication step V the client application 30 obtains the address ADR from the response envelope RSE as in the eighth embodiment. Concepts of any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of the invention maybe implemented by apparatus performing the method steps.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising providing identity-related information about a client application to an honest requesting entity thereby ensuring the true identity of the client application, comprising The steps of:
    a request initiation step, wherein the client application receives from a particular entity a request envelope instructing the client application to forward an inner request comprising an identifier of the honest requesting entity to an identity provider to be selected by the client application;
    a request forwarding step wherein the client application forwards the inner request to the identity provider holding the identity-related information;
    a response initiation step wherein the client application receives from the identity provider a response envelope instructing the client application to forward an inner response comprising the identity-related information requested in the inner request and the identifier;
    an authentication step wherein the client application derives an address of the honest requesting entity having the identifier; and
    a response forwarding step wherein the client application forwards the inner response to The derived address.

2. The method according to claim 1, wherein the request forwarding step and the response initiation step are performed through at least one secure channel, thereby the identity provider ensures the connection to the client application where the identity-related information is sent.

3. The method according to claim 1, wherein the response forwarding step is performed via a further secure channel, thereby the client application ensures the connection to the address resulting from the authentication step.

4. The method according to claim 1, wherein the address is a uniform resource identifier.

5. The method according to claim 1, wherein the authentication step comprises the client application deriving the address of the honest requesting entity having the identifier by a step taken from a group of steps consisting of:
   deriving the address from the identifier provided within the inner request by using local or directory information;
   obtaining the address from the response envelope;
   verifying the address provided in the request envelope with respect to the identifier provided within the inner request by using local or directory information,
   verifying an envelope authentication element provided with the request envelope with respect to the identifier and in the event of the validity of the envelope authentication element using the address provided in the request envelope; and any combination of these steps.

6. A method comprising transferring identity-related information hosted on an identity provider about a client application to an honest requesting entity, comprising the steps of:
   receiving in a request forwarding step from the client application an inner request, wherein prior to the request forwarding step a request initiation step is performed in which the client application receives from a particular entity a request envelope instructing the client application to forward the inner request comprising an identifier of the honest requesting entity to the identity provider; and
   transmitting to the client application in a response initiation step a response envelope instructing the client application to forward an inner response comprising the identity-related information requested in the inner request and the identifier, such that the client application in an authentication step is able to derive an address of the honest requesting entity having the identifier, and in a response forwarding step is able to forward the inner response to the derived address.

7. The method according to claim 6, wherein the inner response further comprises a response authentication element for protection.

8. The method according to claim 7, wherein the response authentication element is based on an extensible markup language signature.

9. The method according to claim 6, wherein prior to the response initiation step the identity provider derives the address from the identifier and inserts the derived address in the response envelope, the derivation being performed by a step taken from a group of steps consisting of:
   deriving the address from the identifier provided within the inner request by using local or directory information;
   verifying the address provided in the inner request with respect to the identifier provided within the inner request by using local or directory information;
   verifying an inner authentication element provided with the inner request with respect to the identifier and in the event of the validity of the inner authentication element using the address provided in the inner request and any combination of these steps.

10. An article of manufacture comprising a computer usable medium having computer readable program code means embodied therein for causing provision of identity-related information, the computer readable program code means in said article of manufacture comprising computer readable program code means for causing a computer to effect the steps of claim 1.

11. A program storage device readable by machine, tangibly embodying a program of instructions executable by the machine to perform method steps for providing identity-related information, said method steps comprising the steps of claim 1.

12. A system for providing identity-related information about a client application to an honest requesting entity, thereby ensuring the true identity of the client application, the system comprising:
   an identity provider providing the identity-related information;
   the client application being connectable to the identity provider; and
   a particular requesting entity from which the client application receives a request envelope instructing the client application to forward an inner request comprising an identifier of the honest requesting entity to the identity provider, wherein the client application is adapted to receive from the identity provider a response envelope instructing the client application to forward an inner response comprising the identity-related information requested in the inner request and the identifier, to derive an address of the honest requesting entity having the identifier, and to forward the inner response to the derived address.

13. The system according to claim 12, wherein the honest requesting entity receiving the inner response verifies a response authentication element provided by the identity provider and the validity of the identifier of the honest requesting entity.

14. The system according to claim 12, wherein the honest requesting entity, when preparing the request envelope, performs one of the steps of:
   inserting the address of the honest requesting entity in the request envelope,
   inserting the address of the honest requesting entity and an envelope authentication element in the request envelope,
   inserting the address of the honest requesting entity in the inner request, and
   inserting the address of the honest requesting entity and an inner authentication element in the inner request.

15. A computer program product comprising a computer usable medium having computer readable program code means embodied therein for causing provision of identity-related information, the computer readable program code means in said computer program product comprising computer readable program code means for causing a computer to effect the functions of claim 12.

16. An apparatus comprising:
   means for providing identity-related information about a client application to an honest requesting entity thereby ensuring the true identity of the client application, said means for providing comprising:
   means for performing a request initiation step wherein the client application receives from a particular requesting entity a request envelope instructing the client application to forward an inner request comprising an identifier of the honest requesting entity to an identity provider to be selected by the client application;

means for performing a request forwarding step wherein the client application forwards the inner request to the identity provider holding the identity-related information;

means for performing a response initiation step wherein the client application receives from the identity provider a response envelope instructing the client application to forward an inner response comprising the identity-related information requested in the inner request and the identifier;

means for performing an authentication step wherein the client application derives an address of the honest requesting entity having the identifier; and means for performing a response forwarding step wherein the client application forwards the inner response to the derived address.

* * * * *